United States Patent
Kou

(10) Patent No.: US 9,890,705 B2
(45) Date of Patent: Feb. 13, 2018

(54) OPEN CYCLE GAS TURBINE SYSTEM HAVING AN ENHANCED COMBUSTION EFFICIENCY

(76) Inventor: Tsung-Hsien Kou, Chia-Yi (TW)

( * ) Notice: Subject to any disclaimer, the term of this patent is extended or adjusted under 35 U.S.C. 154(b) by 948 days.

(21) Appl. No.: 12/818,327

(22) Filed: Jun. 18, 2010

(65) Prior Publication Data

US 2011/0100017 A1    May 5, 2011

(30) Foreign Application Priority Data

Oct. 30, 2009  (TW) .............................. 098136798 A

(51) Int. Cl.
*F02C 3/26* (2006.01)
*F02C 3/36* (2006.01)
*F02C 7/22* (2006.01)

(52) U.S. Cl.
CPC ................. *F02C 3/26* (2013.01); *F02C 3/36* (2013.01); *F02C 7/22* (2013.01)

(58) Field of Classification Search
CPC ...... F02C 3/26; F02C 3/34; F02C 3/36; F02C 6/16; Y02E 50/12; F23G 7/10; F23K 1/02
USPC ......... 60/734, 39.464, 776, 727, 781, 39.12, 60/39.465, 39.53, 39.3, 775, 659; 110/263, 265, 266
See application file for complete search history.

(56) References Cited

U.S. PATENT DOCUMENTS

| | | | | |
|---|---|---|---|---|
| 2,533,866 A | * | 12/1950 | Yellott ................... | B60L 11/02 105/36 |
| 2,735,265 A | * | 2/1956 | Eastman ......................... | 60/775 |
| 2,973,306 A | * | 2/1961 | Chick ..................... | C10B 47/44 201/1 |
| 4,191,535 A | * | 3/1980 | Furman ................... | B30B 11/24 425/107 |
| 4,423,332 A | * | 12/1983 | Fengler ................... | F02B 45/00 180/65.31 |
| 4,546,710 A | * | 10/1985 | Cremer .......................... | 110/263 |
| 4,590,868 A | * | 5/1986 | Ishihara ........................ | 110/347 |
| 4,630,436 A | * | 12/1986 | Frutschi ..................... | 60/39.183 |
| 4,974,411 A | | 12/1990 | Bruckner et al. | |

(Continued)

FOREIGN PATENT DOCUMENTS

GB          650537         2/1951

OTHER PUBLICATIONS www.guttridge.co.uk, Augaflo, web page, 2 pages, Guttridge Services Ltd, Lincolnshire, England.

(Continued)

*Primary Examiner* — Steven Sutherland
(74) *Attorney, Agent, or Firm* — Alan D. Kamrath; Kamrath IP Lawfirm, P.A.

(57) ABSTRACT

An open cycle gas turbine system includes a storage tank, a closed helical supplier, a combustor, a gas turbine, a compressor, a propeller and a generator. After the combustion gas in the combustor enters the gas turbine, the combustion gas is expanded to apply a work and to produce a power to the gas turbine so as to operate the gas turbine so that the compressor is operated to compress the air, the generator is operated to generate an electric power, and the propeller is operated to propel vehicles. The closed helical supplier has a closely sealing effect so that the high pressure combustion gas in the combustor will not leak from the closed helical supplier and will not touch the solid fuel powder in the storage tank.

10 Claims, 2 Drawing Sheets

(56) References Cited

U.S. PATENT DOCUMENTS

| | | | | |
|---|---|---|---|---|
| 5,137,012 | A | * | 8/1992 | Crossman, Jr. ......... F24C 3/006 110/110 |
| 5,309,707 | A | * | 5/1994 | Provol et al. .................... 60/773 |
| 5,341,637 | A | * | 8/1994 | Hamrick .................... 60/39.464 |
| 5,499,498 | A | * | 3/1996 | Isaksson ...................... 60/39.12 |
| 5,765,656 | A | * | 6/1998 | Weaver ...................... 180/65.22 |
| 5,778,675 | A | * | 7/1998 | Nakhamkin .................... 60/652 |
| 5,794,431 | A | * | 8/1998 | Utamura et al. ................ 60/783 |
| 6,862,877 | B1 | * | 3/2005 | James ........................ 60/39.464 |
| 6,968,698 | B2 | * | 11/2005 | Walsh et al. .................... 60/775 |
| 7,937,930 | B1 | * | 5/2011 | Dunn ........................ 60/39.511 |

OTHER PUBLICATIONS

David E. Kaelin, Sr., Derka—Fire and Explosion Hazards in the Handling of Combustible Wood Dusts, Sep. 21, 2012, 53 pages, WEBINAR for Workplace Safety North, Chilworth Technology, Inc., Princeton, NJ, USA.

Wikipedia, Creosote, 5 pages.

Meherwan P. Boyce, Gas Turbine Engineering Handbook Second Edition, Gulf Professional Publishing, Copyright 2002.

George Granger Brown et al., Unit Operations, Feb. 1955, 23 pages.

Sjaak Van Loo, Jaap Koppejan, The Handbook of Biomass Combustion and Co-firing, 2007, Earthscan, p. 19.

Charles Churchman, Stephanie England, The Effects of Increased Pressure on the Reaction Kinetics of Biomass Pyrolysis and Combustion, Oct. 15, 2009, 29 pages, International Applied Engineering, Inc., Marietta, GA, USA.

K.V.N. Srinivasa Rao, The 12th International Conference on Fluidization—New Horizons in Fluidization Engineering, Combustion Studies of Sawdust in a Bubbling Fluidized Bed, 2007, 9 pages, ECI Digital Archives.

I.W. Smith, Nineteenth Symposium (International) on Combustion, The Combustion Rates of Coal Chars: A Review, 1982, 21 pages, The Combustion Institute.

B.C. Young, I.W. Smith, Combustion and Flame, The combustion of Loy Yang Brown Coal Char, Apr. 1989, vol. 76, Issue 1, Elsevier Inc.

Meherwan P. Boyce, Gas Turbine Engineering Handbook Second Edition, 2002, 61 pages, Gulf Professional Publishing, U.S.A.

Conveyor Engineering & Manufacturing, Guardian Shaft Seals, promotional material, 2015, 3 pages, Cedar Rapids, IA.

* cited by examiner

OPEN CYCLE GAS TURBINE SYSTEM HAVING AN ENHANCED COMBUSTION EFFICIENCY

BACKGROUND OF THE INVENTION

1. Field of the Invention

The present invention relates to a gas turbine system and, more particularly, to an open cycle gas turbine system.

2. Description of the Related Art

A conventional open cycle gas turbine system comprises a combustor, a gas turbine, a distributor (or divider), a conduit, a plurality of small tubes, a plurality of smaller air nozzles and a plurality of larger air nozzles. In practice, solid fuel, such as coal and the like, is ground into solid fuel powder. The solid fuel powder exposed in the air is sucked by an impeller of the distributor and is introduced through the conduit, the small tubes, the smaller air nozzles and the larger air nozzles into the combustor. Then, the solid fuel powder is burned in the combustor to produce a combustion gas which is introduced into the gas turbine. In such a manner, the combustion gas is expanded in the gas turbine to apply a work and to produce a power to the gas turbine so as to operate the gas turbine.

BRIEF SUMMARY OF THE INVENTION

The primary objective of the present invention is to provide an open cycle gas turbine system having an enhanced combustion efficiency.

In accordance with the present invention, there is provided an open cycle gas turbine system, comprising a storage tank, a closed helical supplier, a combustor, a gas turbine, a compressor, a propeller and a generator.

The storage tank has a top provided with a top lid. The closed helical supplier is connected to a bottom of the storage tank. The closed helical supplier has a conveying pipe connected to the combustor so that a high pressure combustion gas in the combustor will not leak from the closed helical supplier. The combustor is provided with an ignition tool, a manually operated control valve, and a drain valve. The ignition tool is located between the conveying pipe of the closed helical supplier and the combustor. The control valve is mounted on a connecting line between the combustor and the gas turbine. The gas turbine is connected with the control valve by the connecting line. A rotation shaft of the gas turbine, a rotation shaft of the compressor, a rotation shaft of the propeller and a rotation shaft of the generator are connected with each other and are rotated simultaneously. The compressor is connected with a first pipe which is connected with a oneway valve which is connected with a three-way pipe which is connected with an air storage container with high temperature and high pressure. The air storage container is connected with a pipe which is connected with the combustor. An air flow transmitter is mounted on the pipe and disposed between the air storage container and the combustor. The air flow transmitter is connected with a ratio setter. The ratio setter is connected with a fuel controller. The fuel controller is connected with the closed helical supplier.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
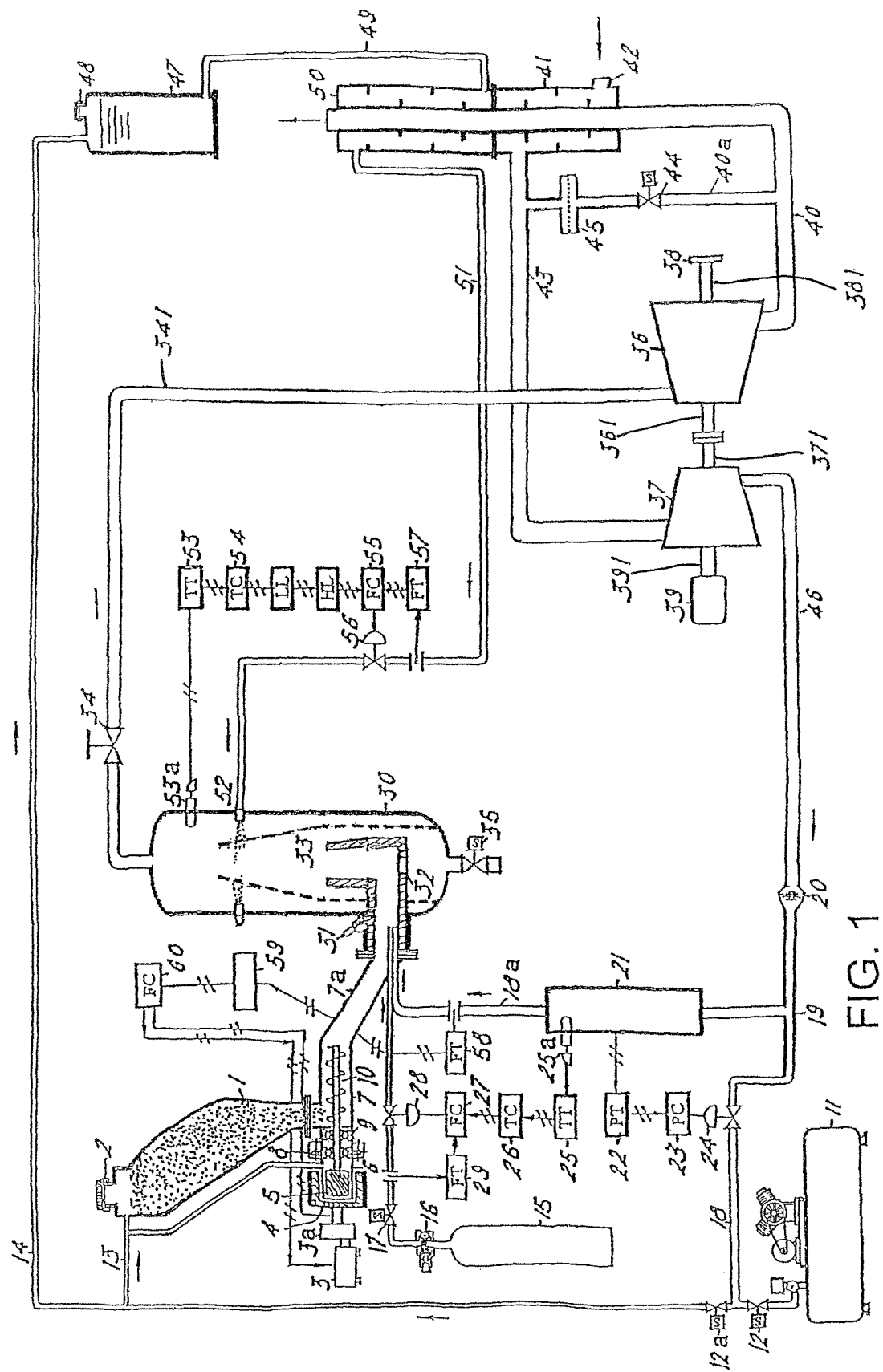
FIG. 1 is a flow chart of an open cycle gas turbine system in accordance with the preferred embodiment of the present invention.
Figure 2:
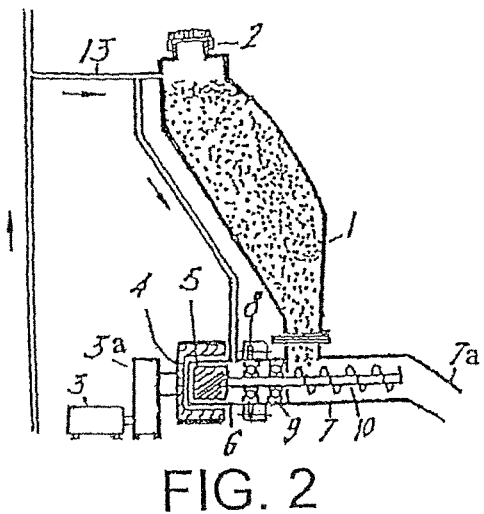
FIG. 2 is a front cross-sectional view of a storage tank and a closed helical supplier of the open cycle gas turbine system as shown in FIG. 1.
Figure 3:
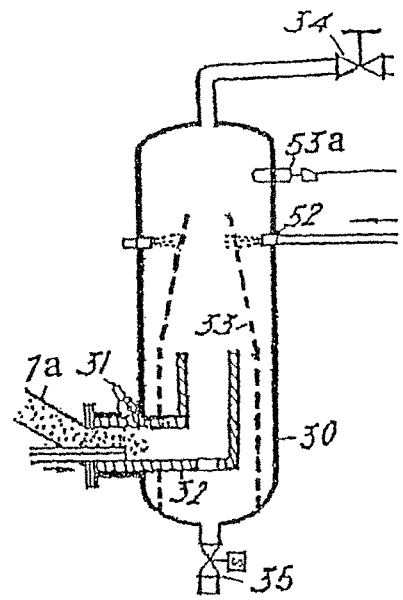
FIG. 3 is a front cross-sectional view of a combustor of the open cycle gas turbine system as shown in FIG. 1.

Referring to the drawings and initially to FIGS. 1-3, an open cycle gas turbine system in accordance with the preferred embodiment of the present invention comprises a storage tank (1), a closed helical supplier (7), a combustor (30), a gas turbine (36), a compressor (37), a power propelled coupler (38) and a generator (39).

The storage tank (1) contains solid fuel powder and can tolerate a high pressure. The storage tank (1) has a top provided with a top lid (2) to fill the solid fuel powder. The closed helical supplier (7) is connected to a bottom of the storage tank (1) so that the solid fuel powder in the storage tank (1) falls into the closed helical supplier (7). The closed helical supplier (7) has a conveying pipe (7a) connected to the combustor (30).

The closed helical supplier (7) includes a motor (3), a gear reduction box (3a), an outer magnet (4), an inner magnet (5), a housing (6), the conveying pipe (7a), an annular gasket (8), a bearing (9) and a helical fin (10). The inner magnet (5) is mounted in the housing (6). The outer magnet (4) is mounted outside of the housing (6) and surrounds the inner magnet (5). The helical fin (10) is combined with the inner magnet (5) to rotate in concert with the inner magnet (5). The motor (3) is combined with the gear reduction box (3a) to construct an actuator which rotates the outer magnet (4) which rotates the inner magnet (5) by the magnetic interaction between the outer magnet (4) and the inner magnet (5) so that the inner magnet (5) is rotated to rotate the helical fin (10). Thus, when the actuator of the closed helical supplier (7) is operated, the solid fuel powder falling from the storage tank (1) into the closed helical supplier (7) is delivered into the conveying pipe (7a) and the combustor (30) quickly.

The combustor (30) is provided with an ignition tool (31), a refractory inner burner (32), a refractory hood (33), a manually operated control valve (34), a drain valve (35), a nozzle (52) and a temperature detector (53a). The ignition tool (31) is located between the conveying pipe (7a) of the closed helical supplier (7) and the combustor (30) to ignite fuel, assistant fuel and air in the combustor (30). The control valve (34) is mounted on a connecting line (341) between the combustor (30) and the gas turbine (36). The inner burner (32) has an L-shaped profile and is mounted on the lower portion of the combustor (30). The refractory hood (33) surrounds the inner burner (32). The drain valve (35) is mounted on the bottom of the combustor (30) and is located under the inner burner (32) to drain burned ashes from the inner burner (32). The nozzle (52) is located above the refractory hood (33) and is connected with a pipe (51) which is connected with a water heater (50). Due to the high temperature of combustion, the high pressure of combustor (30), and the fine fuel powder, the combustion rate is very fast, then the size of the combustor (30) relatively smaller, and the whole system of gas turbine can easily mounted on the vehicle and working as an engine.

The water heater (50) is connected with a pipe (49) which is connected with a water supply barrel (47) which has a top provided with a lid (48). The water heater (50) surrounds a waste gas drain pipe (40) of the gas turbine (36). Thus, the waste gas drain pipe (40) of the gas turbine (36) passes through the water heater (50), and the waste gas from the gas turbine (36) passes through the waste gas drain pipe (40) so that when the water supply barrel (47) supplies water into the water heater (50), the water in the water heater (50) is heated by the waste gas passing through the waste gas drain pipe (40) of the gas turbine (36) to perform a heat exchange action. Then, the heated water in the water heater (50) passes through the pipe (51) and the nozzle (52) into the combustor (30).

The open cycle gas turbine system further comprises a control unit mounted on the pipe (51) and including a valve (56), a flow controller (55), a flow transmitter (57), a temperature controller (54) and a temperature transmitter (53). The valve (56) is connected between the pipe (51) and the flow controller (55). The flow controller (55) is connected between the temperature controller (54) and the flow transmitter (57). The flow transmitter (57) is connected with the pipe (51). The temperature controller (54) is connected between the flow controller (55) and the temperature transmitter (53). The temperature transmitter (53) is connected between the temperature controller (54) and the temperature detector (53a) of the combustor (30). The temperature detector (53a) of the combustor (30) detects and transmits the temperature signals in the combustor (30) to the temperature transmitter (53). The flow transmitter (57) detects and transmits the water flow signals in the pipe (51) to the flow controller (55). The flow transmitter (57) co-operates with the flow controller (55) to construct a secondary circuit control to supplement the water in the pipe (51). Thus, when the temperature in the combustor (30) is too high, the valve (56) is operated to increase the water flow into the nozzle (52) to decrease the temperature in the combustor (30), and when the temperature in the combustor (30) is too low, the valve (56) is operated to decrease the water flow into the nozzle (52) to increase the temperature in the combustor (30).

The gas turbine (36) is connected with the control valve (34) by the connecting line (341). A rotation shaft (361) of the gas turbine (36), a rotation shaft (371) of the compressor (37), a rotation shaft (381) of the power propelled coupler (38) and a rotation shaft (391) of the generator (39) are connected with each other and are rotated simultaneously. Thus, when the combustion gas produced in the combustor (30) enters the gas turbine (36), the combustion gas is expanded in the gas turbine (36) to apply a work to the gas turbine (36) so as to rotate the rotation shaft (361) of the gas turbine (36) so that the compressor (37) is operated to compress the air, the generator (39) is operated to generate an electric power, and the power propelled coupler (38) is operated to propel vehicles and ships as an engine. The compressor (37) is connected with a pipe (46) which is connected with a oneway valve (20) which is connected with a three-way pipe (19) which is connected with an air storage container (21) with high temperature and high pressure. Thus, a high pressure air is stopped by the oneway valve (20) so that the high pressure air is allowed to enter the air storage container (21) and cannot enter the pipe (46).

The air storage container (21) is connected with a pipe (18a) which is connected with the combustor (30). An air flow transmitter (58) is mounted on the pipe (18a) and disposed between the air storage container (21) and the combustor (30). The air flow transmitter (58) is connected with a ratio setter (59). The ratio setter (59) is connected with a fuel controller (60). The fuel controller (60) is connected with the closed helical supplier (7). The air flow transmitter (58) detects the air flow in the pipe (18a) and sends the detected air flow to the ratio setter (59) and the fuel controller (60). The fuel controller (60) is connected with the actuator of the closed helical supplier (7) to adjust the rotation speed of the actuator so as to regulate the moving speed of the solid fuel powder from the storage tank (1) through the conveying pipe (7a) of the closed helical supplier (7) into the inner burner (32) of the combustor (30).

The open cycle gas turbine system further comprises an assistant fuel adding device including a steel barrel (15) connected with the combustor (30) to receive a high pressure assistant fuel, such as natural gas and the like, a valve (17) connected between the steel barrel (15) and the combustor (30) to control flow of the fuel in the steel barrel (15), a pressure regulating valve (16) connected between the steel barrel (15) and the valve (17) to regulate the pressure in the steel barrel (15) and a control valve (28) connected between the valve (17) and the combustor (30). The control valve (28) is connected with a flow controller (27) which is connected with a temperature controller (26) which is connected with a temperature transmitter (25) which is connected with a temperature detector (25a) which is fixed on the air storage container (21). The temperature detector (25a) detects the temperature in the air storage container (21) and sends the detected temperature to the temperature transmitter (25). The flow controller (27) is also connected with a flow transmitter (29) which is connected between the valve (17) and the control valve (28). The flow transmitter (29) detects the fuel flow passing through the valve (17) and sends the detected fuel flow to the flow controller (27). The flow transmitter (29) co-operates with the flow controller (27) to construct a secondary circuit control to supplement the fuel from the steel barrel (15) into the combustor (30). Thus, when the temperature in the air storage container (21) is lower than a preset value (which is higher than the burned temperature of the solid fuel powder), the detected temperature signal of the temperature detector (25a) is transmitted through the temperature transmitter (25) and the temperature controller (26) to the flow controller (27) which opens the control valve (28) so that the fuel in the steel barrel (15) is introduced into the combustor (30).

The open cycle gas turbine system further comprises a miniature air compressor accumulator (11) to supply a cold air with a high pressure. The miniature air compressor accumulator (11) has a valve (12) which is connected with a valve (12a) and a pipe (18) by a tee pipe. The valve (12a) is connected with a pipe (13) which is connected with the storage tank (1) and the closed helical supplier (7) to introduce a high pressure cold air into the storage tank (1) and the closed helical supplier (7). The valve (12a) is also connected with a pipe (14) which is connected with the water supply barrel (47). The pipe (18) is connected with the air storage container (21) and the oneway valve (20) by the three-way pipe (19). A control valve (24) is mounted between the pipe (18) and the three-way pipe (19) and is connected with a pressure controller (23) which is connected with a pressure transmitter (22) which is connected with the air storage container (21). The pressure transmitter (22) is mounted onto the air storage container (21) to detect the pressure in the air storage container (21) and to send the detected pressure to the pressure controller (23) which controls operation of the control valve (24).

When in use, when the valve (12) is opened and the other valve (12a) is closed, the high-pressure air in the miniature air compressor accumulator (11) flows via the pipe (18), the three-way pipe (19), the air storage container (21) and the pipe (18a) into the combustor (30) to assist the combustion of the fuel, and produces high-pressure and high-temperature combustion gas immediately. The combustion gas is expanded in the gas turbine (36) to apply a work to the gas turbine (36) so as to rotate the rotation shaft (361) of the gas turbine (36) so that the compressor (37) is operated to compress the air. When the high pressure air flows from the compressor (37) via the pipe (46), the oneway valve (20) and the three-way pipe (19) into the air storage container (21), the pressure in the air storage container (21) is increased to reach a preset pressure limit, and the pressure transmitter (22) sends a signal to the pressure controller (23) which closes the control valve (24) to interrupt the high pressure air in the pipe (18). Then, the valve (12a) is slightly opened, and a little of the high-pressure air in the miniature air compressor accumulator (11) in turn flows through the pipe (13) into the storage tank (1) and the closed helical supplier (7) so that the pressure in the storage tank (1) and the closed helical supplier (7) is permanently kept higher than that in the combustor (30) so as to prevent the burned gas from flowing backward from the combustor (30) into the storage tank (1) and the closed helical supplier (7).

The open cycle gas turbine system further comprises an air preheating device including an air preheater (41) surrounding the waste gas drain pipe (40) of the gas turbine (36), a pipe (43) connected between the air preheater (41) and the compressor (37), a pipe (40a) connected between the pipe (43) and the waste gas drain pipe (40), a valve (44) mounted on the pipe (40a) and a waste gas filter (45) mounted on the pipe (40a) and located between the pipe (43) and the valve (44). The air preheater (41) has a cold air inlet (42). The ambient air passing through the cold air inlet (42) into the air preheater (41) is heated by the waste gas drain pipe (40) of the gas turbine (36), and the preheated air in the air preheater (41) flows through the pipe (43) into the compressor (37).

In practice, after the compressor (37) is operated by the gas turbine (36), the preheated air from the air preheater (41) and the waste gas from the waste gas filter (45) are sucked and introduced through the pipe (43) into the compressor (37). Then, the preheated air from the air preheater (41) and the waste gas are compressed in the compressor (37) to form a high temperature air. Then, the high temperature air from the compressor (37) in turn flows through the pipe (46), the oneway valve (20), the three-way pipe (19), the air storage container (21) and the pipe (18a) into the combustor (30) to help burning the solid fuel powder in the combustor (30).

In operation, referring to Fig, 1, when the valve (12) is opened and the valve (12a) is closed, the high pressure air in the miniature air compressor accumulator (11) flows through the pipe (18) and the three-way pipe (19) into the air storage container (21) and then flows through the pipe (18a) into the combustor (30) so as to increase the pressure in the combustor (30). At this time, the air flow transmitter (58) detects the air flow in the pipe (18a) and sends the detected air flow to the ratio setter (59) and the fuel controller (60), and the fuel controller (60) is connected with the actuator of the closed helical supplier (7) to adjust the rotation speed of the actuator so as to regulate the moving speed of the solid fuel powder from the storage tank (1) through the conveying pipe (7a) of the closed helical. supplier (7) into the inner burner (32) of the combustor (30).

At the same time, the valve 17 is opened so that the high pressure assistant fuel in the steel barrel (15) flows through the pressure regulating valve (16), the valve 17 and the control valve (28) into the inner burner (32) of the combustor (30). Then, the ignition tool (31) ignites the assistant fuel and the solid fuel powder in the combustor (30). Then, the valve (12a) is opened so that the high pressure air in the miniature air compressor accumulator (11) is introduced through the pipe (13) into the storage tank (1) and the closed helical supplier (7) and is introduced through the pipe (14) into the water supply barrel (47). After the combustion gas produced in thecombustor (30) passes through the control valve (34) into the gas turbine (36), the combustion gas is expanded in the gas turbine (36) to apply a work to the gas turbine (36) so as to rotate the rotation shaft (361) of the gas turbine (36) so that the compressor (37) is operated to compress the air, the generator (39) is operated to generate an electric power, and the power propelled coupler (38) is operated to propel vehicles ships and the like.

Then, most of the waste gas produced by the gas turbine (36) flows through the waste gas drain pipe (40), the air preheater (41) and the water heater (50) and is drained to the ambient environment, and a little of the waste gas produced by the gas turbine (36) flows through the waste gas drain pipe (40), the pipe (40a), the valve (44) and the waste gas filter (45) into the pipe (43), so that the preheated air from the air preheater (41) and the waste gas from the waste gas filter (45) are mixed to form a high temperature air which is sucked and introduced through the pipe (43) into the compressor (37). Then, the high temperature air is compressed in the compressor (37). Then, the high temperature air from the compressor (37) in turn flows through the pipe (46) and the oneway valve (20) into the three-way pipe (19). At this time, the high temperature air in the three-way pipe (19) has a pressure smaller than that of the high pressure air in the pipe (18) so that the high temperature air in the three-way pipe (19) is forced to flow into the air storage container (21).

When the pressure in the air storage container (21) is increased to reach a preset pressure limit, the pressure transmitter (22) sends a signal to the pressure controller (23) which closes the control valve (24) to interrupt the high pressure air in the pipe (18). At the same time, when the temperature in the air storage container (21) is increased to reach a preset temperature limit, the temperature detector (25a) sends a signal through the temperature transmitter (25) and the temperature controller (26) to the flow controller (27) which closes the control valve (28) to interrupt and prevent the assistant fuel of the steel barrel (15) from entering the combustor (30) so as to save the assistant fuel. Then, the air with high temperature and pressure the air storage container (21) flows through the pipe (18a) into the combustor (30) to help burning the solid fuel powder in the combustor (30).

When the temperature in the combustor (30) is increased to exceed a preset temperature limit, the temperature detector (53a) sends a signal through the temperature transmitter (53) and the temperature controller (54) to the flow controller (55) which opens the valve (56) so that the pipe (51) is connected to the nozzle (52). In such a manner, the water in the water supply barrel (47) is pressed by the high pressure air from the pipe (14) to flow through the pipe (49), the water heater (50), the pipe (51), the valve (56) and the nozzle (52) into the combustor (30) to decrease the temperature in the combustor (30).

Figure 4:
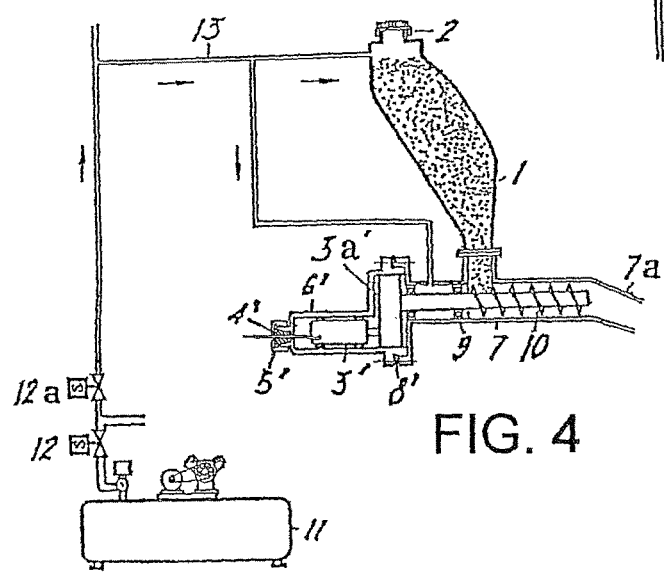
FIG. 4 is a front cross-sectional view of a storage tank and a closed helical supplier of an open cycle gas turbine system in accordance with another preferred embodiment of the present invention.

As shown in FIG. 4, the closed helical supplier (7) includes a motor (3'), a gear reduction box (3a'), a rubber tap (4'), a hollow helical cap (5'), a housing (6'), the conveying pipe (7a), an annular gasket (8'), a bearing (9) and a helical fin (10). The motor (3') has an electric cord passing through the rubber tap (4') and the helical cap (5'). The helical cap (5') is located outside of the housing (6'). The rubber tap (4') is fixed in and sealed by the helical cap (5'). The annular gasket (8') is mounted in the housing (6'). The helical fin (10) is mounted in the housing of the helical fin (10). The motor (3') is combined with the gear reduction box (3a') to construct an actuator which rotates the helical fin (10). Thus, when the actuator of the closed helical supplier (7) is operated, the solid fuel powder falling from the storage tank (1) into the closed helical supplier (7) is delivered into the conveying pipe (7a) and the combustor (30) quickly. The actuator of the closed helical supplier (7) is mounted in the housing (6').

Figure 5:
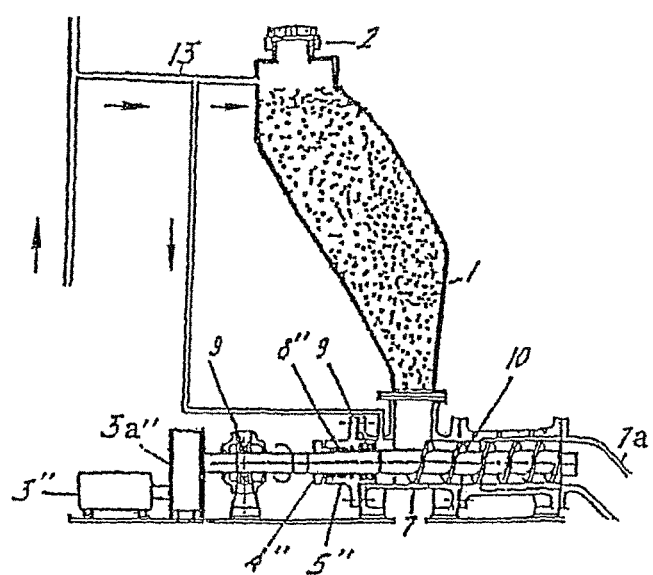
FIG. 5 is a front cross-sectional view of a storage tank and a closed helical supplier of an open cycle gas turbine system in accordance with another preferred embodiment of the present invention.

As shown in FIG. 5, the closed helical supplier (7) includes a motor (3"), a gear reduction box (3a"), a gland flange (4"), a stuffing box (5"), a housing (6'), the conveying pipe (7a), a gland packing (8"), a bearing (9) and a helical fin (10). The motor (3") is combined with the gear reduction box (3a") to construct an actuator which rotates the helical fin (10). Thus, when the actuator of the closed helical supplier (7) is operated, the solid fuel powder falling from the storage tank (1) into the closed helical supplier (7) is delivered into the conveying pipe (7a) and the combustor (30) quickly. The stuffing box (5") is mounted between the actuator and the helical fin (10). The gland packing (8") is mounted in the stuffing box (5") and is tightened and sealed by the gland flange (4") to form a gland sealing.

Accordingly, the closed helical supplier (7) has a closely sealing effect so that the high pressure combustion gas in the combustor (30) will not leak from the closed helical supplier (7) and will not touch the solid fuel powder in the storage tank (1). In addition, the open cycle gas turbine system is provided with an assistant fuel adding device which adds the assistant fuel into the combustor (30) automatically so as to help burning the solid fuel powder in the combustor (30) so that the open cycle gas turbine system can be started and operated easily and quickly. Further, the open cycle gas turbine system is provided with a miniature air compressor accumulator (11) which supplies a high pressure air into the combustor (30) to increase the pressure in the combustor (30) and to help burning the solid fuel powder in the combustor (30). Further, the miniature air compressor accumulator (11) also supplies a high pressure air into the storage tank (1) and the closed helical supplier (7) so that the pressure in the storage tank (1) and the closed helical supplier (7) is permanently kept higher than that in the combustor (30) so as to prevent the burned gas in the combustor (30) from flowing back into the storage tank (1) and the closed helical supplier (7). Further, the open cycle gas turbine system is provided with an air preheating device which co-operates with the compressor (37) to form a high temperature air which is introduced into the combustor (30) to help burning the solid fuel powder in the combustor (30). Further, the combustor (30) is provided with a refractory inner burner (32) and a refractory hood (33) to prevent the combustor (30) from being burned by the strong burning flame. Further, the water in the water supply barrel (47) is pressed by the high pressure air from the miniature air compressor accumulator (11) to flow through the water heater (50) and the nozzle (52) into the combustor (30) to decrease the temperature in the combustor (30) so that the open cycle gas turbine system has an automatic cooling function.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A system for combustion of solid fuel powder, which comprises: a storage tank (1), an inner magnet (5) combination with a helical fin (10) mounting in a housing (6) and an outer magnet-actuator surrounding outside the housing (6) to form a closed helical supplier (7), a combustor (30), a gas turbine (36), a compressor (37), a power propelled coupler (38) and a generator (39), wherein:

the storage tank (1) comprises a pressure tank, and a top provided with a top lid (2);

the inner magnet (5) combination with the helical fin (10) mounting in said housing (6) and the outer magnet-actuator surrounding outside said housing (6) to form the closed helical supplier (7) is connected to a bottom of said storage tank (1);

said inner magnet (5) combination with said helical fin (10) mounting in said housing (6) and said outer magnet-actuator surrounding outside said housing (6) to form said closed helical supplier (7) includes a motor (3), a gear reduction box (3a), an outer magnet (4), an inner magnet (5), a housing (6), a conveying pipe (7a), an annular gasket (8), a bearing (9) and a helical fin (10);

the inner magnet (5) is mounted in the housing (6);

the outer magnet (4) is mounted outside of said housing (6) and surrounds said inner magnet (5);

the helical fin (10) is combined with said inner magnet (5) to rotate in concert with said inner magnet (5);

the motor (3) is combined with the gear reduction box (3a) to construct an actuator which rotates said outer magnet (4) which rotates said inner magnet (5) by the magnetic interaction between said outer magnet (4) and said inner magnet (5) so that said inner magnet (5) is rotated to rotate said helical fin (10);

said inner magnet (5) combination with said helical fin (10) mounting in said housing (6) and said outer magnet-actuator surrounding outside said housing (6) to form said closed helical supplier (7) has the conveying pipe (7a) connected to the combustor (30) so that the solid fuel powder is directly delivered into said combustor (30);

said combustor (30) and the gas turbine (36) are connected by a connecting line (341);

a rotation shaft (361) of said gas turbine (36), a rotation shaft (371) of the compressor (37), a rotation shaft (381) of the power propelled coupler (38) and a rotation shaft (391) of the generator (39) are connected with each other and are rotated simultaneously; and said compressor (37) is connected a first pipe (46) to said combustor (30).

2. A system for combustion of solid fuel powder, which comprises: a storage tank (1), a motor electric cord thread rubber tap (4') fixed in and sealed by a hollow helical cap (5') to form a closed helical supplier (7'), a combustor (30), a gas turbine (36), a compressor (37), a power propelled coupler (38) and a generator (39), wherein:
the storage tank (1) comprises a pressure tank, and a top provided with a top lid (2);
the motor electric cord thread rubber tap (4') fixed in and sealed by the hollow helical cap (5') to form the closed helical supplier (7') is connected to a bottom of said storage tank (1);
said motor electric cord thread rubber tap (4') fixed in and sealed by said hollow helical cap (5') to form said closed helical supplier (7') includes a motor (3'), a gear reduction box (3a'), a rubber tap (4'), a hollow helical cap (5'), a housing (6'), a conveying pipe (7a), an annular gasket (8'), a bearing (9) and a helical fin (10);
said motor (3') has an electric cord passing through the rubber tap (4') and the hollow helical cap (5');
said hollow helical cap (5') is located outside of the housing (6');
said rubber tap (4') is fixed in and sealed by said hollow helical cap (5');
the annular gasket (8') is mounted in said housing (6');
the helical fin (10) is mounted in the housing (6') of the helical fin (10);
said motor (3') is combined with the gear reduction box (3a') to construct an actuator which rotates said helical fin (10);
the actuator is mounted in said housing (6');
said motor electric cord thread rubber tap (4') fixed in and sealed by the hollow helical cap (5') to form said closed helical supplier (7') has the conveying pipe (7a) connected to the combustor (30) so that the solid fuel powder is directly delivered into said combustor (30);
said combustor (30) and the gas turbine (36) are connected by a connecting line (341);
a rotation shaft (361) of said gas turbine (36), a rotation shaft (371) of the compressor (37), a rotation shaft (381) of the power propelled coupler (38) and a rotation shaft (391) of the generator (39) are connected with each other and are rotated simultaneously; and
said compressor (37) is connected a first pipe (46) to said combustor (30).

3. A system for combustion of solid fuel powder, which comprises: a storage tank (1), a stuffing box (5") mounted between an actuator and a helical fin (10) as a shaft seal to form a closed helical supplier (7"), a combustor (30), a gas turbine (36), a compressor (37), a power propelled coupler (38) and a generator (39), wherein:
the storage tank (1) comprises a pressure tank, and a top provided with a top lid (2);
the stuffing box (5") mounted between the actuator and the helical fin (10) as the shaft seal to form the closed helical supplier (7") is connected to a bottom of said storage tank (1);
said stuffing box (5") mounted between said actuator and said helical fin (10) as a shaft seal to form said closed helical supplier (7") includes a motor (3"), a gear reduction box (3a"), a gland flange (4"), the stuffing box (5"), a conveying pipe (7a), a gland packing (8"), a bearing (9) and the helical fin (10);
the motor (3") is combined with the gear reduction box (3 a ") to construct the actuator which rotates the helical fin (10);
the stuffing box (5") is mounted between the actuator and the helical fin (10);
the gland packing (8") is mounted in said stuffing box (5") and is tightened and sealed by the gland flange (4") to form a gland sealing;
said stuffing box (5") mounted between the actuator and the helical fin (10) as the shaft seal to form said closed helical supplier (7") has the conveying pipe (7a) connected to the combustor (30) so that the solid fuel powder is directly delivered into said combustor (30);
said combustor (30) and the gas turbine (36) are connected by a connecting line (341);
a rotation shaft (361) of said gas turbine (36), a rotation shaft (371) of the compressor (37), a rotation shaft (381) of the power propelled coupler (38) and a rotation shaft (391) of the generator (39) are connected with each other and are rotated simultaneously; and
said compressor (37) is connected with a first pipe (46) to said combustor (30).

4. The system as claimed in any one of claims 1 to 3, further comprising an assistant fuel adding device and an air storage container (21) between a three-way pipe (19) and a second pipe (18a); wherein
the assistant fuel adding device including a steel barrel (15) connected with the combustor (30), a valve (17) connected between the steel barrel (15) and the combustor (30), a pressure regulating valve (16) connected between said steel barrel (15) and the valve (17), and a control valve (28) connected between said valve (17) and said combustor (30); and
the control valve (28) is connected with a flow controller (27) which is connected with a temperature controller (26) which is connected with a temperature transmitter (25) which is connected with a temperature detector (25a) which is fixed on an air storage container (21).

5. The system as claimed in any one of claims 1 to 3, further comprising a miniature air compressor accumulator (11) to supply air, wherein:
the miniature air compressor accumulator (11) has a valve (12) which is connected with a valve (12a) and a third pipe (18) by a tee pipe;
the valve (12a) is connected with a fourth pipe (13) which is connected with the storage tank (1) and the closed helical supplier (7);
the third pipe (18) is connected with an air storage container (21) and an a oneway valve (20) by the three-way pipe (19); and
a control valve (24) is mounted between said third pipe (18) and said three-way pipe (19) and is connected with a pressure controller (23) which is connected with a pressure transmitter (22) which is connected with said air storage container (21).

6. A method for combustion, comprising:
providing a closed helical supplier (7') including a motor (3'), a rubber tap (4'), a hollow helical cap (5'), a housing (6') and an annular gasket (8');
passing an electric cord of the motor (3') through the rubber tap (4') fixed in and sealed by the hollow helical cap (5') located outside the housing (6') and with the annular gasket (8') mounted in the housing (6');
feeding a solid fuel powder from the closed helical supplier (7') into a combustor (30) for combustion to produce a high-pressure and high-temperature combusting gas;
guiding the high-pressure and high-temperature combusting gas into a gas turbine (36) for expansive working to drive a shaft (361) of the gas turbine (36) to rotate shafts of said gas turbine (36), an air compressor (37), a power propelled coupler (38) and a generator (39) which are connected, such that air is being compressed and pumped by said air compressor (37); and guiding the air being compressed and pumped by said air compressor (37) into said combustor (30) to assist the combustion of said solid fuel powder.

7. A method for combustion, comprising:

feeding a solid fuel powder into a combustor (30) for combustion with an inner magnet (5) combination with a helical fin (10) mounting in a housing (6) and an outer magnet-actuator surrounding outside the housing (6) to form a closed helical supplier (7), to produce a high-pressure and high-temperature combusting gas;

guiding the high-pressure and high-temperature combusting gas into a gas turbine (36) for expansive working to drive a shaft (361) of the gas turbine (36), an air compressor (37), a power propelled coupler (38) and a generator (39) which are connected, such that air is compressed and pumped by said air compressor (37); and guiding the air being compressed and pumped by said air compressor (37) into said combustor (30) to assist combustion of said solid fuel powder.

8. A method for combustion, comprising:

providing a closed helical supplier (7") including a stuffing box (5") between an actuator and a helical fin (10) and including a gland packing (8") in the stuffing box (5") forming a gland sealing with a gland flange (4");

feeding a solid fuel powder from the closed helical supplier (7") into a combustor (30) for combustion to produce a high-pressure and high-temperature combusting gas;

guiding the high-pressure and high-temperature combusting gas into a gas turbine (36) for expansive working to drive a shaft (361) of the gas turbine (36), an air compressor (37), a power propelled coupler (38) and a generator (39) which are connected, such that air is compressed and pumped by said air compressor (37); and guiding the air being compressed and pumped by said air compressor (37) into said combustor (30) to assist combustion of said solid fuel powder.

9. The method as claimed in any one of claims 6, 7 and claim 8, further comprising:

guiding a high pressure assistant fuel to flow from a steel barrel (15) to the combustor (30) for burning with the solid fuel powder to produce the high-pressure and high-temperature combusting gas; and when a temperature of said air compressed and pumped by said air compressor (37) rises to a setting temperature, shutting off an input of the high pressure assistant fuel into said combustor.

10. The method as claimed in any one of claims 6, 7 and claim 8, further comprising:

guiding a high pressure air from a miniature air compressor accumulator (11) into the combustor (30);

then slightly turning on a valve to let the high pressure air slowly bypass into a fuel storage tank (1) and the closed helical supplier separately, such that pressures thereof are permanently maintained higher than that of said combustor; and when a pressure of said air compressed and pumped by said air compressor (37) is increased to a setting pressure, shutting off an input of said high pressure air of said combustor from said miniature air compressor accumulator (11).

\* \* \* \* \*